(12) United States Patent
Li

(10) Patent No.: US 11,249,933 B2
(45) Date of Patent: Feb. 15, 2022

(54) MIPI D-PHY CIRCUIT

(71) Applicants: SHANGHAI IC R&D CENTER CO., LTD., Shanghai (CN); CHENGDU IMAGE DESIGN TECHNOLOGY CO. LTD., Chengdu (CN)

(72) Inventor: Ting Li, Shanghai (CN)

(73) Assignees: SHANGHAI IC R&D CENTER CO., LTD, Shanghai (CN); CHENGDU IMAGE DESIGN TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 16/957,745

(22) PCT Filed: Aug. 29, 2018

(86) PCT No.: PCT/CN2018/102888
§ 371 (c)(1),
(2) Date: Jun. 25, 2020

(87) PCT Pub. No.: WO2019/128277
PCT Pub. Date: Jul. 4, 2019

(65) Prior Publication Data
US 2020/0349102 A1    Nov. 5, 2020

(30) Foreign Application Priority Data

Dec. 27, 2017    (CN) .......................... 201711445289.8

(51) Int. Cl.
*G06F 13/40* (2006.01)
*G06F 13/42* (2006.01)

(52) U.S. Cl.
CPC ...... *G06F 13/4072* (2013.01); *G06F 13/4273* (2013.01)

(58) Field of Classification Search
CPC .............................................. G06F 4072/4273
See application file for complete search history.

(56) References Cited

U.S. PATENT DOCUMENTS

| 6,198,777 | B1 * | 3/2001 | Feher | ........................ G06F 1/04 375/295 |
| 2002/0097682 | A1 * | 7/2002 | Enam | ............... H03K 19/01812 370/241 |

(Continued)

FOREIGN PATENT DOCUMENTS

CN    105493062 A    4/2016

Primary Examiner — Henry Tsai
Assistant Examiner — Aurangzeb Hassan
(74) Attorney, Agent, or Firm — Tianchen LLC.; Yuan R. Li; Yi Fan Yin

(57) ABSTRACT

A MIPI D-PHY circuit comprises a main control module, a controlled module, an internal data source generating module, and a configuration register. The main control module and the controlled module are respectively connected to the configuration register, and the main control module is connected to the internal data source generating module. The main control module and the controlled module comprise a clock channel and a data channel respectively. The clock channel and the data channel in the main control module and the data channel and the clock channel in the controlled module both comprise an error detection unit. The MIPI D-PHY circuit provided by the present disclosure adopts the error detection unit to detect the signals of the main control module and the controlled module.

10 Claims, 3 Drawing Sheets

(56) References Cited

U.S. PATENT DOCUMENTS

| | | | | |
|---|---|---|---|---|
| 2003/0051192 | A1* | 3/2003 | Pillay | G01R 31/31705 |
| | | | | 714/39 |
| 2003/0093702 | A1* | 5/2003 | Luo | G06F 1/32 |
| | | | | 713/320 |
| 2004/0264619 | A1* | 12/2004 | Bonaccio | H04L 7/033 |
| | | | | 375/373 |
| 2005/0195930 | A1* | 9/2005 | Spital | H04L 7/046 |
| | | | | 375/368 |
| 2007/0047964 | A1* | 3/2007 | Ooi | H04B 10/66 |
| | | | | 398/147 |
| 2007/0065157 | A1* | 3/2007 | Katagiri | H04L 27/223 |
| | | | | 398/155 |
| 2010/0091921 | A1* | 4/2010 | Den Besten | H04L 7/0008 |
| | | | | 375/354 |
| 2010/0220376 | A1* | 9/2010 | Kobayashi | H04B 10/5053 |
| | | | | 359/238 |
| 2014/0094128 | A1* | 4/2014 | Yu | G06F 13/4072 |
| | | | | 455/68 |
| 2014/0241442 | A1* | 8/2014 | Ahmadi | H03L 7/0996 |
| | | | | 375/259 |
| 2015/0229467 | A1* | 8/2015 | Lee | H04L 7/0016 |
| | | | | 375/371 |
| 2016/0063948 | A1* | 3/2016 | Han | G09G 5/003 |
| | | | | 345/213 |
| 2017/0032757 | A1* | 2/2017 | Itoigawa | G09G 5/008 |
| 2018/0019861 | A1* | 1/2018 | Pak | H04W 76/14 |
| 2018/0182452 | A1* | 6/2018 | Lee | G11C 11/5671 |
| 2018/0364780 | A1* | 12/2018 | Muthukaruppan | |
| | | | | G06F 13/4068 |
| 2019/0188159 | A1* | 6/2019 | Song | G06F 13/4295 |
| 2020/0176158 | A1* | 6/2020 | Strong | H01L 39/14 |

* cited by examiner

MIPI D-PHY CIRCUIT

CROSS-REFERENCE TO RELATED APPLICATION

This application claims priority of International Patent Application Serial No. PCT/CN2018/102888, filed Aug. 29, 2018, which is related to and claims priority of Chinese patent application Serial No. 201711445289.8, filed Dec. 27, 2017. The entirety of each of the above-mentioned patent applications is hereby incorporated herein by reference and made a part of this specification.

TECHNICAL FIELD

The present disclosure relates to the field of digital circuits, in particular to a MIPI D-PHY circuit.

BACKGROUND

MIPI (Mobile Industry Processor Interface) is not only an alliance but also the name of a set of interface protocol specifications. It has different working groups to meet different needs of each subsystem of the mobile terminal. The different working groups are responsible for formulating specific protocols, and respectively define a set of internal interface standards for mobile devices for different hardware devices, such as camera serial interface (CSI), display serial interface (DSI), radio frequency interface (DigRF), etc.

The D-PHY is one of the MIPI protocols. The D-PHY provides a definition of display serial interface (DSI) and camera serial interface (CSI) on the physical layer. The D-PHY describes the physical layer of source synchronization, high speed and low-power consumption. The current D-PHY modules are compatible with the corresponding external data source controller. The signal transmission compatibility between the current D-PHY modules are too poor, and the content of the received signals cannot be detected. When a signal is received incorrectly, it is easy to cause confusion of the whole circuit.

The clocks rates of serial-to-parallel conversion subunit and parallel-to-serial conversion subunit in the D-PHY circuit modules are fastest in the whole MIPI module, which is designed according to 1.5 Gbit/channel transmission rate, DDR clock rate here is 750 MHz. so the serial-to-parallel conversion subunit and parallel-to-serial conversion subunit in the D-PHY modules are also the most critical part of the whole D-PHY circuit, and is crucial for the whole D-PHY circuit to work in high-speed mode. Most of the serial-to-parallel conversions and parallel-to-serial conversions use analog circuits to be built, but the design of analog circuits is complex and the power consumption of analog circuits is high.

SUMMARY

The technical problem to be solved by the present disclosure is to provide a MIPI D-PHY circuit, which adopts an error detection unit to detect the signals of a main control module and a controlled module, and high-speed serial-parallel conversion and high-speed parallel-serial conversion are realized by digital circuits, which reduces the area of the MIPI D-PHY circuit and reduces the complexity of the whole circuit.

In order to achieve the above purpose, the present disclosure adopts the following technical scheme: a MIPI D-PHY circuit, which comprises a main control module, a controlled module, an internal data source generating module and a configuration register; the main control module and the controlled module are respectively connected to the configuration register; the main control module is connected to the internal data source generating module; the main control module and the controlled module both comprise a clock channel and a data channel, and the clock channel and the data channel in the main control module and the controlled module comprise an error detection unit respectively.

Further, the main control module comprises 1 channel-4 data channels.

Further, the controlled module comprises 1 channel-4 data channels.

Further, the configuration register comprises an I2C interface configuration register and an APB bus configuration register.

Further, the clock channel and the data channel comprise a counter unit, a state machine unit, an error detection unit, and an output unit respectively, and the three terminals of the state machine unit are respectively connected to the counter unit, the error detection unit, and the output unit.

Further, the state machine unit comprises a high-speed state and an ultra-low power consumption state.

Further, when the error detection unit detects a signal error in the data channel or the clock channel, the entire clock channel or data channel is kept in a STOP state.

Further, the output unit comprises a serial-parallel conversion subunit and a parallel-serial conversion subunit, and the serial-parallel conversion subunit and the parallel-serial conversion subunit are both implemented by a digital circuit.

Further, the serial-to-parallel conversion subunit and the parallel-to-serial conversion subunit comprise two 4-bit shift registers. One of the two shift registers works along the rising edge of the clock in the double-edge sampling high-speed mode I phase clock, the other works along the rising edge of the clock in the double-edge sampling high-speed mode Q phase clock, and the phase relationship between the double-edge sampling high-speed mode I phase clock and the double-edge sampling high-speed mode Q phase clock are complementary, so that the data in the two shift registers are cross-combined to get 8-bit parallel data.

Further, the output unit comprises a 4-bit counter, the clock in the double-edge sampling inputted is divided by 4 to obtain the high-speed mode clock at the receiving end by a 4-bit counter, after each count of 4, the EN signal is pulled high for one cycle, and the 8-bit data is outputted once.

The beneficial effects of the present disclosure as follows:

The present disclosure adopts the error detection circuit to detect the signals of the main control module and the controlled module, the external configurable register to meet the timing sequence required by the register configuration protocol, and the high-speed serial-parallel conversion and the high-speed parallel-serial conversion are realized by digital circuit. The timing sequence of the register configuration protocol can make the input clock range of the module more flexible. Moreover, the I2C interface configuration register can meet the requirements of the configuration register having a simple chip interface. The APB bus configuration register can be connected to the AMBA bus and configured by the main controller. The error detection unit improves the D-PHY modules compatibility; the serial-to-parallel conversion subunit and the parallel-to-serial conversion subunit make the circuit area smaller, the power consumption less, and the circuit complexity lower.

DETAILED DESCRIPTION

The content of the present disclosure will be further described in detail below in conjunction with the accompanying drawings of the specification. It should be understood that the present disclosure can have various changes on different examples, all of which do not depart from the scope of the present disclosure, and the descriptions and illustrations therein are essentially for illustrative purposes, rather than to limit the present disclosure. It should be noted that the drawings are in a very simplified form and all use inaccurate ratios, which are only used to conveniently and clearly assist the purpose of explaining the embodiments of the present disclosure.

Figure 1:
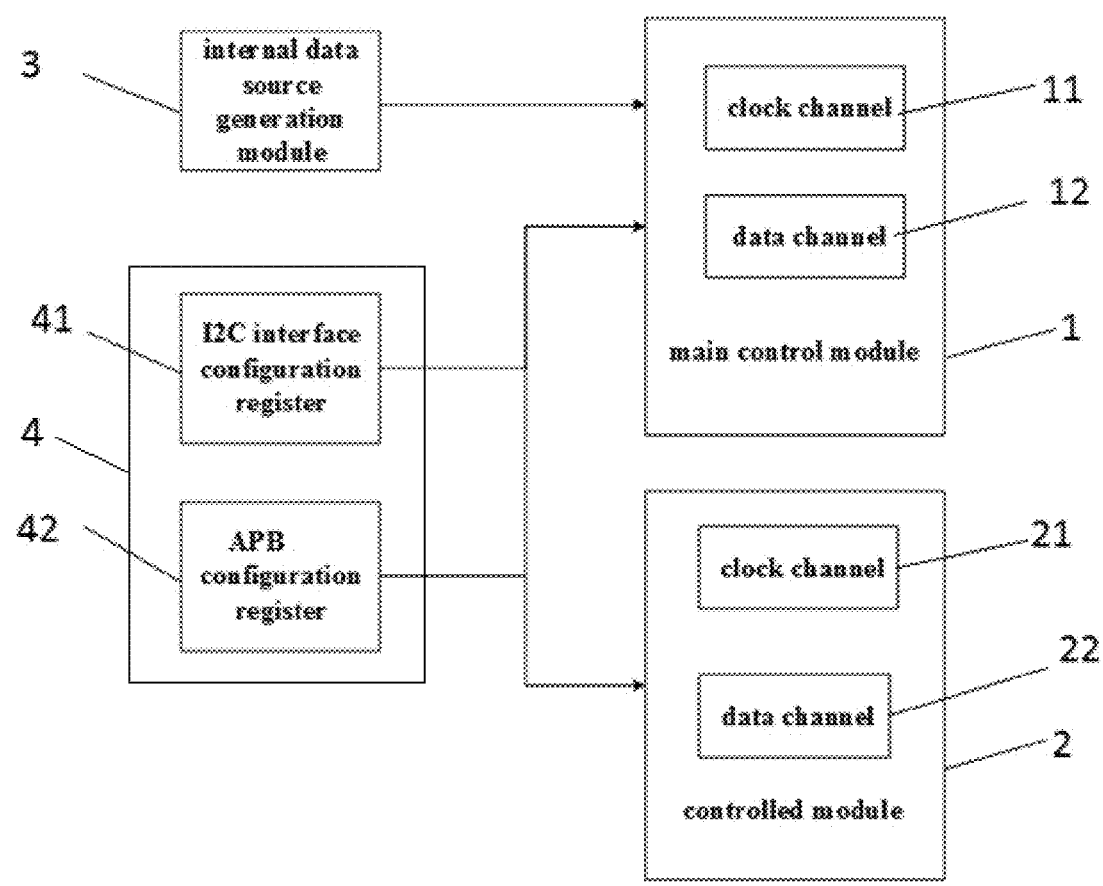
FIG. 1 is a structural frame diagram of a D-PHY circuit with a MIPI interface of the present disclosure

As shown in FIG. 1, a MIPI D-PHY circuit provided by the present disclosure comprises a main control module 1, a controlled module 2, an internal data source generating module 3, and a configuration register 4. The main control module 1 and the controlled module 2 are respectively connected to the configuration register 4. The main control module 1 is connected to the internal data source generating module 3. Both the main control module 1 and the controlled module 2 comprise a clock channel 11, 21 and a data channel 12, 22, and the clock channel 11 and the data channel 12 in the main control module 1 and the clock channel 21 and the data channel 22 in the controlled module 2 comprise error detection units 53. Wherein, the configuration register 4 in the present disclosure comprises an I2C interface configuration register 41 and an APB (Advanced Peripheral Bus) configuration register 42. When the main control module 1 sends CIS pixel data, the I2C interface configuration register 41 can be used. When the controlled module 2 sends CIS pixel data, the MIPI interface can be used as the data input for the ISP module, and the APB configuration register 42 can be used. The timing sequence of the register configuration protocol can make the input clock range of the ISP module more flexible. Moreover, the I2C interface configuration register 41 can meet the requirements of the configuration register 4 having a simple chip interface. The APB configuration register 42 can be connected to the AMBA bus and configured by the main controller 1.

The D-PHY circuit usually comprises a clock channel and 1 channel-4 data channels. In the present disclosure, the main control module 1 and the controlled module 2 are set separately, and the main control module 1 and the controlled module 2 respectively comprise a clock channel 11, 21 and 1-4 Data channels 12, 22. The main control module 1 is used to receive the command sent by the internal data source generating module 3 or sent by the external data source controller, and send the corresponding signal to the adjacent D-PHY circuit. The controlled module 2 is used to receive external signals sent to the D-PHY circuit.

Figure 2:
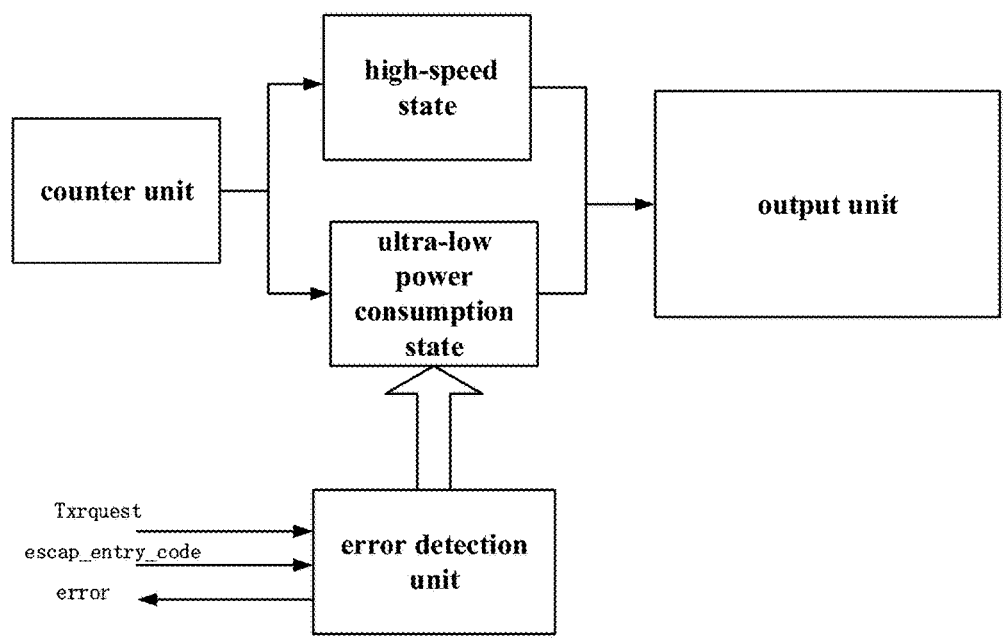
FIG. 2 is an internal frame diagram of a clock channel and a data channel of the present disclosure

As shown in FIG. 2, the main control module and the controlled module of the present disclosure comprise clock channels and data channels, and each of the clock channels and the data channels comprise a counter unit 51, a state machine unit 52, an error detection unit 53, and an output unit 54. The three terminals of the state machine unit 52 are respectively connected to the counter unit 51, the error detection unit 53 and the output unit 54. Wherein, the data transmission of the D-PHY circuit supports high-speed modes and ultra-low power consumption modes. The high-speed modes are mainly used for the transmission of high-speed pixel stream data; the ultra-low power consumption modes are generally used for the transmission of control signals. Therefore, the state machine units 52 in all clock channels and data channels in the present disclosure comprise the high-speed state and the ultra-low power consumption state.

The error detection unit 53 exists in the data channel 11 and the clock channel 12 in the main control module 1 and the data channel 12 and the clock channel 22 in the controlled module 2. Therefore, when the error detection unit 53 in the main control module 1 receives the command sent by the internal data source generating module 3 or the external data source controller, the command will be checked for error detection, and then feedbacks or errors will be reported. The error detection function of the error detection unit 53 located in the data channel 12 of the main control module 1 is as follows:

(1) detect whether the request signal TxRequestHS of the data channel under high speed state is incorrect;

(2) detect the start time and the end time of the data channel;

(3) detect request signals received by the data channel in the high-speed state (hs-state) and the ultra-low power state (ulps-state). If two request signals are detected at the same time, an error is fed back to the internal data source module or the external data source controller, and at the same time, the data channel is kept in a STOP state;

(4) detect the Escape Entry Codes received, if the Escape Entry Codes are not identifiable code streams in the protocol, the data channel does not enter the low power consumption mode, waiting for the end signal to return to the STOP state, and an Escape Entry Codes error is fed back to the input terminal, for prompting to restart at the same time;

(5) in ULPS mode, the state mark1 must maintain a Twakeup time to ensure the switching time between different states, but when the Twakeup time is detected to be less than 1 ms, an Error prompt input is outputted.

The error detection function of the error detection unit 53 located in the clock channel 11 of the main control module 1 is as follows:

(1) detect whether the request signal TxRequestHSclk of the clock channel under the high-speed state is incorrect;

(2) detect request signals of the clock channel in the high-speed state (hs-state) and the ultra-low power state (ulps-state). If the two request signals are detected at the same time, an error is fed back to the internal data source module or the external data source controller, and at the same time, the clock channel is kept in a STOP state.

For the error detection unit in the controlled module, when receiving the signal sent from the outside, it will detect the signal if there is a error, and then feedback or report the error. The error detection function of the error detection unit 53 located in the data channel 22 of the controlled module 2 is as follows:

(1) if the Escape Entry Codes received by DP signals and DN signals are not identifiable code streams in the protocol, the data channel does not enter the ultra-low power state, and wait for the end signal to return to the stop state, and an Escape Entry Codes error is fed back to the input terminal at the same time, for prompting to restart.

(2) In ULPS mode, the mark1 state must maintain a Twakeup time to ensure the switching time between different states, but when the Twakeup time is detected to be less than 1 ms, an Error prompt is output to the input end.

(3) The controlled module RX-TOP mainly uses the DP signals and the DN signals to ensure the operation of the state machine, and detects the DP signals and the DN signals to ascertain each state.

The error detection function of the error detection unit 53 located in the clock channel 21 of the controlled module 2 is as follows:

(1) the controlled module RX-TOP uses the DP signals and the DN signals to ensure the operation of the state machine, and detects the DP signals and the DN signals to ascertain each status.

In the present disclosure, the main control module 1 and the controlled module 2 of the D-PHY circuit will detect the data received and transmitted, and improve the compatibility with different external data sources.

Figure 3:
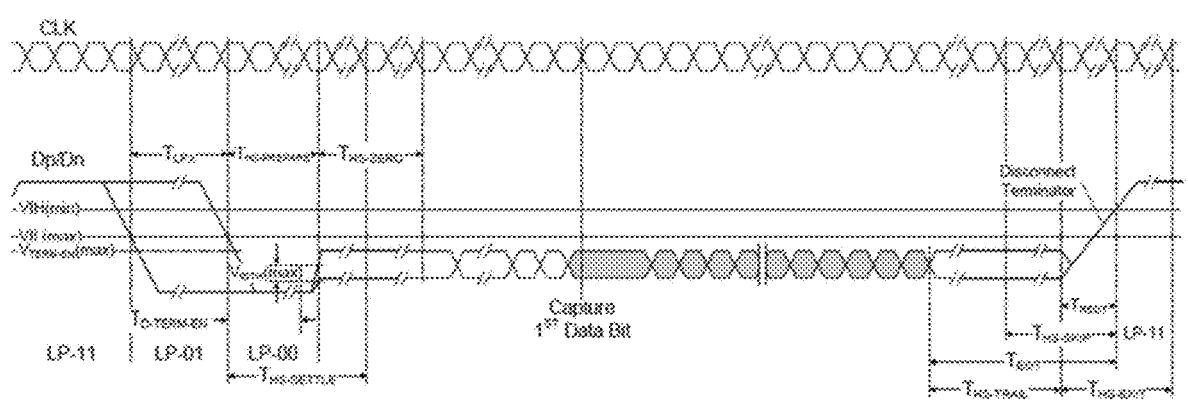
FIG. 3 is a timing sequence diagram of the high-speed transmission state of the present disclosure

As shown in FIG. 3, it is a timing sequence diagram of the D-PHY circuit in the high-speed transmission mode of the present disclosure. After entering the HS mode, the sending end will send a meaningless 0 first, then send a synchronization header 10111000, and then start sending the first bit of data. When the data is sent, a section of the TRAIL data will be sent. This module circuit receives the serial-to-parallel converted data, finds the synchronization header HS_DATA_SYNC=10111000 from the adjacent two byte data, and determines the position where the data starts. According to the obtained position, the subsequent 8-bit data is correctly transmitted to the upper layer circuit for use. After the data is received, because there is a section of the TRAIL data, and this module cannot correctly identify the meaning of this data. However, the technical proposal according to the present disclosure supports sending data according to EoTp, that is, after each high-speed frame transmission is completed, an EoTp short packet needs to be added to indicate transmission and reception. Therefore, it is necessary to introduce EoTp signals decoded from the underlying protocol layer. When EoTp_rcvd is high, the data valid signal RxValidHS is pulled down to avoid decoding the TRAIL data in the underlying protocol layer.

Figure 4:
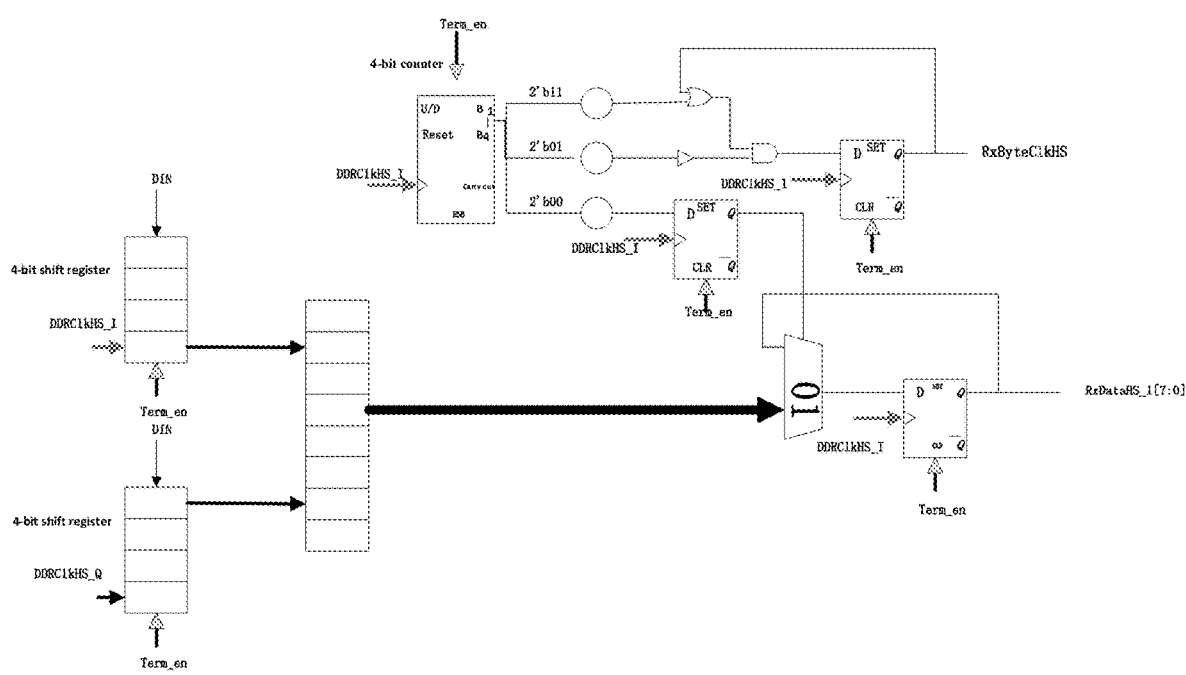
FIG. 4 is a structural diagram of a serial-to-parallel conversion subunit in the present disclosure

The present disclosure provides a MIPI D-PHY circuit. The output unit 4 in the clock channel and the data channel comprises a serial-parallel conversion subunit and a parallel-serial conversion subunit, and both the serial-parallel conversion subunit and the parallel-serial conversion subunit are adopt digital circuit. As shown in FIG. 4, it is a schematic diagram of the serial-to-parallel conversion subunit of the present disclosure. The function of the serial-to-parallel conversion subunit is to convert high-speed serial data into 8-bit parallel data. For any one of the data channel, the two 4-bit shift registers 61, 62 are used to receive serial data. One of the two shift registers 61 works on the rising edge of the clock in the double-edge sampling high-speed mode in-phase clock DDRClkHS_I, and the other 62 works on the rising edge of the clock in the double-edge sampling high speed mode quadrature-phase clock DDRClkHS_Q. The phases relationship of DDRClkHS_I and DDRClkHS_Q are complementary, so that the data in the two shift registers 61, 62 are cross-combined to get 8-bit parallel data. For the clock channel, a 4-bit counter 63 designed divides the DDR clock inputted by 4 to obtain the high-speed mode clock RxByteClkHS at the receiving end. After each count of 4, the ENABLE signal is pulled high for one cycle, and 8-bit data is outputted once. The serial-to-parallel conversion subunit and the parallel-to-serial conversion subunit of the present disclosure make the circuit area smaller, the power consumption less, and the circuit complexity lower.

While the present disclosure has been particularly shown and described with references to preferred embodiments thereof, if will be understood by those skilled in the art that various changes in form and details may be made herein without departing from the spirit and scope of the present disclosure as defined by the appended claims.

What is claimed is:

1. A MIPI D-PHY circuit, comprising a main control module, a controlled module, an internal data source generating module, and a configuration register, wherein the main control module and the controlled module are respectively connected to the configuration register; the main control module is connected to the internal data source generating module; the main control module comprises a first clock channel and a first data channel and the controlled module comprises a second clock channel and a second data channel, and each of the first clock channel, the first data channel, the second clock channel and the second data channel comprises an error detection unit; the error detection unit in the main control module receives a command sent by the internal data source generating module or an external data source controller and checks the command for error detection, and then feedbacks or reports errors; the error detection unit in the controlled module receives signal sent from outside and detects the signal if there is an error, and then feedbacks or reports the error.

2. The MIPI D-PHY circuit of claim 1, wherein the main control module comprises 1-4 data channels.

3. The MIPI D-PHY circuit of claim 1, wherein the controlled module comprises 1-4 data channels.

4. The MIPI D-PHY circuit of claim 1, wherein the configuration register comprises an I2C interface configuration register and an APB configuration register.

5. The MIPI D-PHY circuit of claim 1, wherein the clock channel and the data channel comprise a counter unit, a state machine unit, the error detection unit, and an output unit respectively, and three terminals of the state machine unit are respectively connected to the counter unit, the error detection unit, and the output unit.

6. The MIPI D-PHY circuit of claim 5, wherein the state machine unit comprises a high-speed state and an ultra-low power consumption state.

7. The MIPI D-PHY circuit of claim 6, wherein when the error detection unit detects a signal error in the data channel or the clock channel, the entire clock channel or data channel is kept in a STOP state.

8. The MIPI D-PHY circuit of claim 5, wherein the output unit comprises a serial-parallel conversion subunit and a parallel-serial conversion subunit, and the serial-parallel conversion subunit and the parallel-serial conversion subunit are both implemented by a digital circuit.

9. The MIPI D-PHY circuit of claim 8, wherein the serial-to-parallel conversion subunit and the parallel-to-serial conversion subunit comprise two 4-bit shift registers, one of the two shift registers works along the rising edge of the clock in the double-edge sampling high-speed mode in phase clock, the other works along the rising edge of the clock in the double-edge sampling high-speed mode quadrature-phase clock, and the phase relationship between the double-edge sampling high-speed mode in phase clock and the double-edge sampling high-speed mode quadrature-phase clock are complementary, so that the data in the two shift registers are cross-combined to get 8-bit parallel data.

10. The MIPI D-PHY circuit of claim 8, wherein the output unit comprises a 4-bit counter, the clock in the double-edge sampling inputted is divided by 4 to obtain the high-speed mode clock at the receiving end by a 4-bit counter, after each count of 4, the ENABLE signal is pulled high for one cycle, and the 8-bit data is outputted once.

* * * * *